United States Patent [19]
Isham

[11] 3,722,605
[45] Mar. 27, 1973

[54] APPARATUS AND METHOD FOR DETERMINING RELATIVE ORIENTATION OF TWO WELLS

[75] Inventor: Carroll E. Isham, Buena Park, Calif.

[73] Assignee: Scientific Drilling Controls, Costa Mesa, Calif.

[22] Filed: Feb. 3, 1971

[21] Appl. No.: 112,328

[52] U.S. Cl. .................175/40, 175/61, 175/73
[51] Int. Cl. .................E21b 47/00, E21b 7/04
[58] Field of Search....175/40, 61, 50; 181/26, .5 BE, 181/.5 P, .5 ED, .5 EC, .5 T, .5 EM; 340/15.5; 166/250, 254, 285

[56] References Cited

UNITED STATES PATENTS

| | | | |
|---|---|---|---|
| 3,282,355 | 11/1966 | Henderson | 175/40 X |
| 3,285,350 | 11/1966 | Henderson | 175/62 X |
| 2,305,384 | 12/1942 | Hoover et al. | 175/50 X |
| 2,452,515 | 10/1948 | Athy | 175/50 X |
| 3,626,482 | 12/1971 | Quichaud et al. | 175/50 |

Primary Examiner—Joseph H. McGlynn
Assistant Examiner—Richard E. Favreau
Attorney—William P. Green

[57] ABSTRACT

The relative positioning of two wells is determined by receiving at a subsurface location in one of the wells sound emanating from the second well, and determining the direction of the second well from the first by reference to the direction of approach of the sound.

17 Claims, 6 Drawing Figures

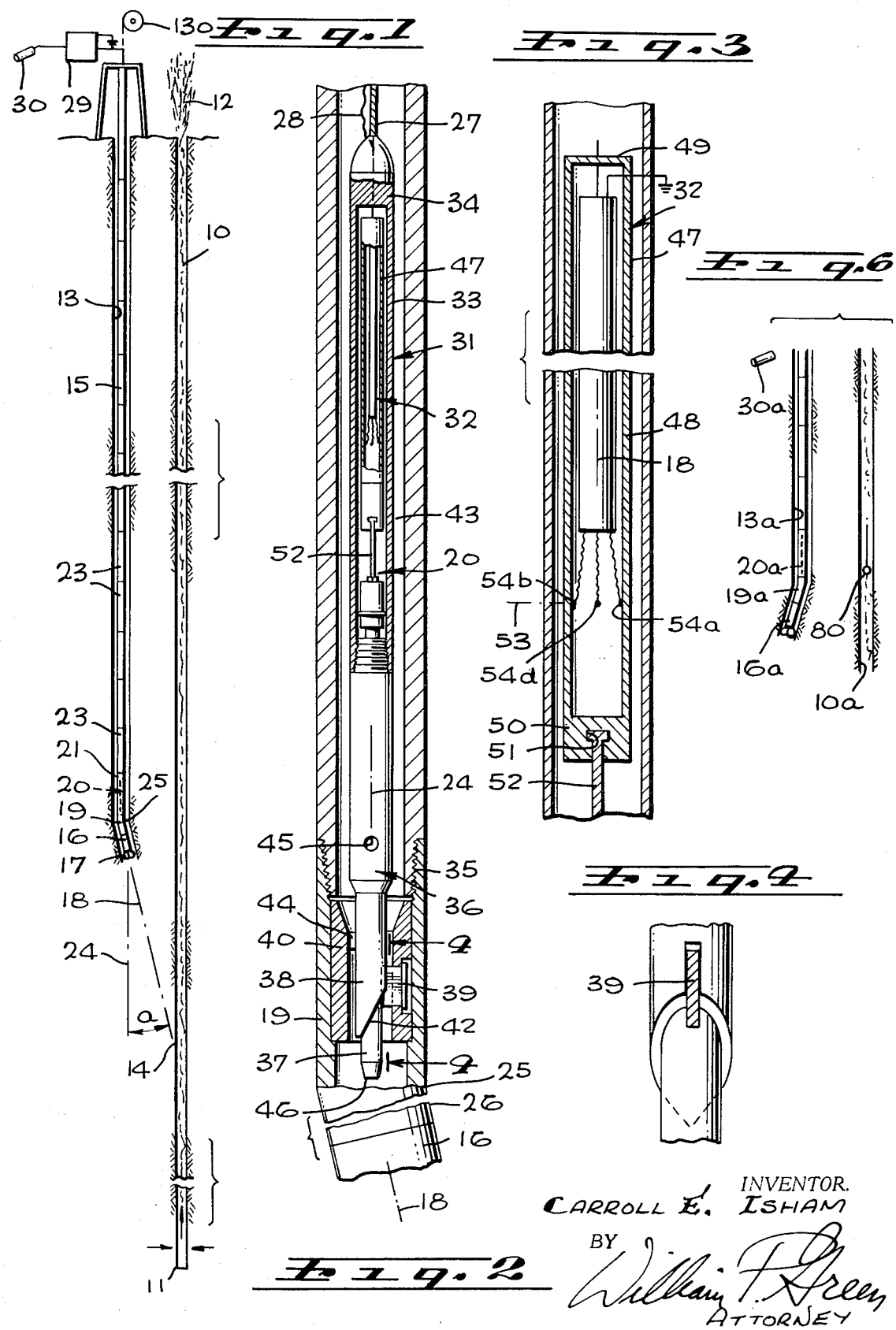

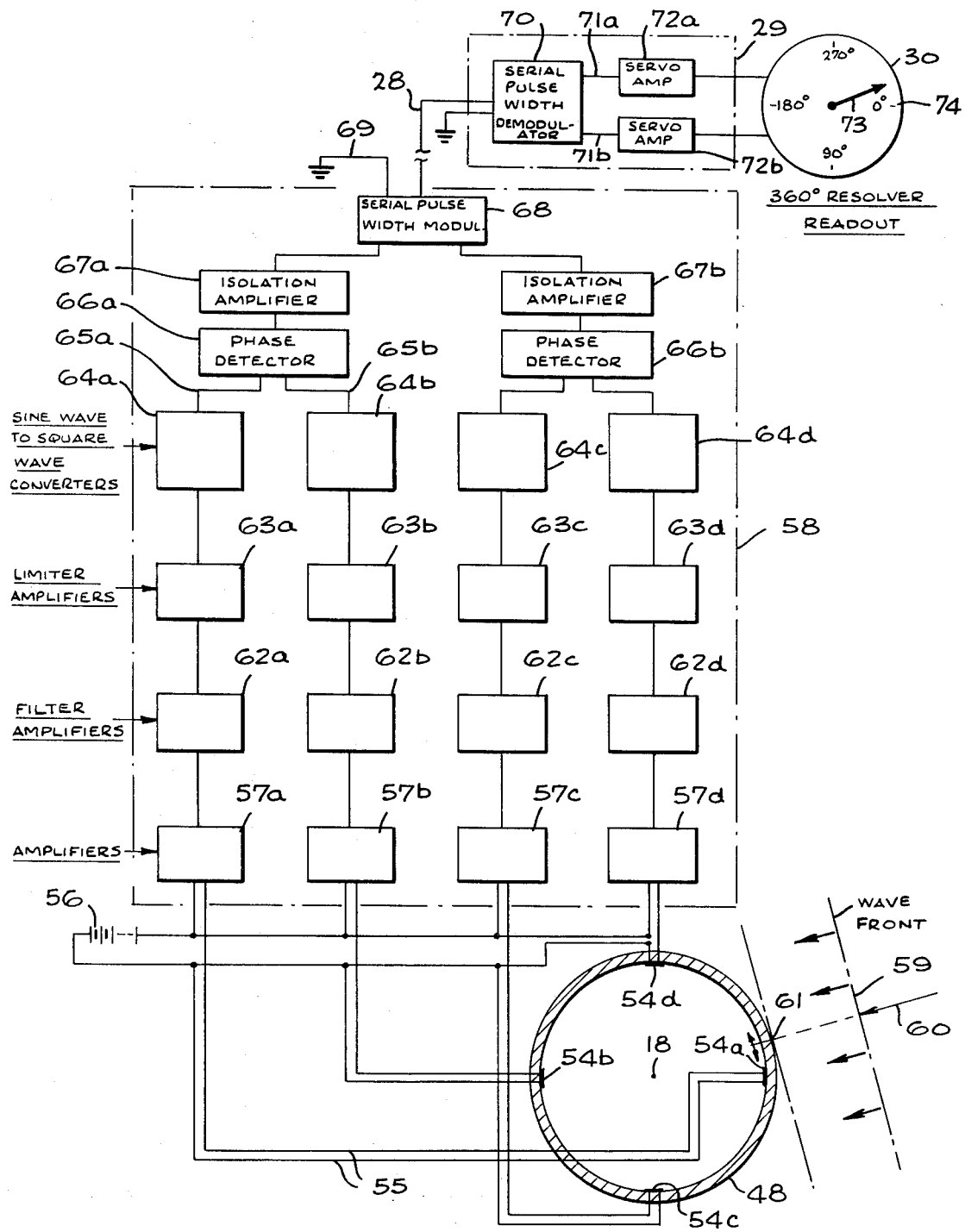

3,722,605

APPARATUS AND METHOD FOR DETERMINING RELATIVE ORIENTATION OF TWO WELLS

BACKGROUND OF THE INVENTION

This invention relates to improved methods and apparatus for facilitating the drilling of wells, and particularly for determining the direction of one well from another at a subsurface location.

In various situations during the drilling of a well, it may become desirable and almost critical to determine the precise location of the well being drilled with respect to another nearby well. For instance, when a 'relief hole' or relief well is being drilled adjacent an out-of-control well, for the purpose of intersecting the latter at a subsurface location, and injecting materials thereinto, it is desirable that as accurate information as possible be obtained as to the direction between the wells. In the past, however, conventional surveying techniques have not been precise enough to enable directional drilling of such a relief hole with sufficient accuracy to assure intersection of the two wells at a desired subsurface location.

Another situation in which it is desirable to know accurately the directional relationship between two wells occurs when a number of production wells are being drilled in close proximity within the same field. In this instance, it is necessary to avoid intersection of one well with another. However, here again, conventional surveying methods do not afford adequate information to definitely assure against the drilling of one hole into another.

SUMMARY OF THE INVENTION

The methods and apparatus of the present invention enable highly effective determination of the direction of one well from another at a location far beneath the surface of the earth, and with reliability and in a manner not dependent upon the usual necessity for correlation of two separate surveys of the wells for arriving at a mere estimate of their relative positioning. Further, the directional information can be obtained without the necessity for withdrawing the drill string from the well, and can be updated frequently between successive drilling intervals in order to enable continual monitoring of the extent to which one hole is aimed toward or away from the other. If the well being drilled is a relief hole, it may be guided toward the out-of-control well to intersect it. If the two wells are both production wells, on the other hand, one may be easily aimed in a direction away from the other to thus positively prevent unwanted intersection of the wells.

To attain the discussed directional information, the present invention employs unique apparatus which can be lowered into one well and is adapted to receive and respond to sound emanating from the other well. When that other well is out of control, the sound is produced by the rapid upward gushing movement of oil, sand, gravel, et cetera within the well. In other types of wells, a suitable sound producing unit may be purposely lowered into one well and listened to in the other well. The sound receiving apparatus is designed to be directionally responsive to the sound, to thus indicate the direction between wells by the direction of approach of the sound. The directional information obtained in this manner may then be transmitted to the surface of the earth through a wire line or the like for visual and directly readable display to the operator.

In the preferred arrangement, the directional response of the apparatus is achieved by providing means for receiving the sound or vibrations produced thereby at a plurality of slightly different locations in the well. The sound may then arrive at these different locations at slightly different times, by virtue of the spacing between the locations, and the differences in the times of arrival of the sound at the different locations can be used in calculating the direction from which the sound came. Preferably, the sound is received by a number of transducers which are mounted for response to the vibrations of different portions of the side wall of a tubular element in the well. Impingement of a particular wave front on this tubular element at a certain location about its periphery initiates the transmission of the wave circularly about the tubular element, to actuate the different transducers at different times corresponding to the circular distances from the point of initial impingement of the wave on the tubular element to the different transducers. Outputs from a pair of the transducers may be fed to a suitable phase detector, to produce a signal dependent upon the difference in times of arrival of the sound waves at these transducers. A second and similar pair of transducers actuating another phase detector may be offset 90° from the first pair, with the outputs of the two phase detectors acting to control the operation of a 360° resolver which reads out at the surface of the earth the direction of one well from another.

BRIEF DESCRIPTION OF THE DRAWINGS

The above and other features and objects of the invention will be better understood from the following detailed description of the typical embodiments illustrated in the accompanying drawings, in which:

FIG. 1 illustrates the manner in which a 'relief hole' may be drilled into a nearby out-of-control well utilizing the methods and apparatus of the present invention;

FIG. 2 is an enlarged partly sectional view of a portion of the apparatus of FIG. 1;

FIG. 3 is a further enlarged fragmentary view of the sound receiving device of FIG. 2;

FIG. 4 is an enlarged fragmentary section taken on line 4—4 of FIG. 2;

FIG. 5 represents the electrical circuit of the apparatus of FIG. 1; and

FIG. 6 is a view similar to FIG. 1, but showing the manner in which the present methods and apparatus may be employed for directing one well away from rather than toward an adjacent closely proximate second well.

DESCRIPTION OF THE PREFERRED EMBODIMENTS

With reference first to FIG. 1, I have shown diagrammatically at 10 in that figure a first well which is out of control, with oil and/or other materials flowing upwardly in the well from a source location 11 and being discharged from the upper end of the well in completely uncontrolled manner, as indicated at 12. In order to stop this loss of fluid from well 10, a second well or 'relief hole' 13 is drilled into the earth at a location near well 10, with the intention of intersecting well 10 at a subsurface location 14 spaced above the location 11, to enable the injection of plugging materials into well 10 from the relief hole in an attempt to close off the upward loss of material.

The relief hole 13 is formed by a drill string represented at 15, which may be of a type utilizing a 'mud motor drill' 16 at its lower end for driving the bit 17 to drill the hole. That is, drill 16 is of a type containing a down-hole motor, typically a suitable turbine motor, which is driven by the pressure of the circulation fluid or mud within drill string 15, and which in turn drives the bit 17 about its axis 18. After the circulation fluid has passed through the motor, the fluid discharges from the lower end of the motor and past bit 17 and then flows upwardly in conventional manner within the annulus about the drill string and to the surface of the earth. The outer housing of the drill motor 16 does not itself turn in the well, nor does the drill string 15 above the motor.

Connected into the drill string at a location directly above the motor, there is provided a conventional orienting sub 19 into which the lower end of a tool 20 embodying the present invention projects. Above sub 19, the drill string includes a section 21 containing the major portion of tool 20 and having an upper portion 22 which is threadedly connected to and aligned with the lowermost one of a series of threadedly interconnected straight drill pipe sections 23 forming the main portion of the drill string. At a location 25, sub 19 is bent slightly so that its lower portion 26 extends along and is centered about the slightly inclined axis 18, rather than the typically directly vertical axis 24 of the main upper portion of the string. As will be understood, the purpose of the bend in section 19 is to direct drill 16 and bit 17 slightly laterally in order to cause hole 13 to advance gradually toward and ultimately intersect the wild well 10 at the location 14. If desired, the bend may be formed in the housing of drill 16 rather than sub 19.

Referring now to FIG. 2, the tool 20 is lowered into the drill string on a conventional wire line or cable 27, along which a related electrical conductor 28 extends for conveying information to a responsive circuit 29 at the surface of the earth (FIG. 1), and a readout unit 30. Appropriate powered reeling equipment 130 is of course provided at the surface of the earth for raising and lowering tool 20 by reeling in and out the supporting wire line 27.

The tool 20 includes in upper protective barrel section 31 which contains a sound responsive instrument 32 embodying the invention and adapted to respond to the sound produced by the upwardly gushing materials contained within the out-of-control well 10. More particularly, barrel 31 may have a tubular side wall 33 centered about and extending along axis 24, and closed at its upper end by a portion 34 of barrel 31 to which wire line 27 is connected in supporting relation. At its lower end, the side wall 33 of barrel 31 is threadedly connected at 35 to the upper end of a conventional orienting bull-plug assembly 36 having a stinger 37 and 'mule shoe' 38 of known construction. This mule shoe is engageable with an axially extending locating key 39 carried by and projecting radially inwardly from the wall of orienting sub 19 to retain tool 20 against turning movement about axis 18 from a predetermined properly oriented and known position relative to the orienting sub and remainder of the drill string. Key 39 may be retained and located by a sleeve 40, which is contained within orienting sub 19 and rigidly locked in fixed position relative thereto. The mule shoe 38 has an axially extending keyway or recess 41 at one location about its periphery into which key 39 projects in the properly oriented position of FIG. 2. The usual camming surface 42 of the mule shoe acts upon lowering of tool 20 to automatically turn the mule shoe and the reminder of the tool about axis 18 to the properly oriented relation, by virtue of engagement of the upper end of key 39 with the cam surface. The tool 20 is constructed to permit downward flow of the drilling fluid past tool 20 and to drill motor 16 and bit 17 while tool 20 is in the FIG. 2 position. For this purpose, the upper portion of the tool may be small enough to leave a fluid downflow space thereabout, and the lower portion of the tool may be constructed to allow fluid downflow through a spacer 44 about the mule shoe, and/or to pass the circulating fluid into an aperture 45 in part 36 and then downwardly through a passage within the stinger.

The sound responsive instrument 32 has a vertically elongated housing 47 with a tubular internally and externally cylindrical side wall 48 essentially centered about vertical axis 24. The upper end of housing 47 is closed by a top wall 49, and the lower end is closed by a bottom wall 50 containing a T-slot 51 within which there is received a T-shaped projection 52 of conventional construction carried by and projecting upwardly from bull-plug assembly 36, to orient instrument 32 rotatively relative to the bull-plug, and thus relative to the orienting sub 19 through the key 39 and mule shoe 38. As is customary, key 39 is located at the 'high side' of orienting sub 19, that is, the side facing in the direction toward which bit 17 is aimed.

The tubular side wall 48 of instrument housing 47 is formed of a material which is essentially rigid and stiff but which will vibrate in response to the impingement of a sound wave upon a portion of the outer surface of side wall 48, and will then conduct the received sound or resultant vibrations circularly about axis 18 from that location of initial impingement. For best results, side wall 48 should be formed of a suitable essentially rigid metal, such as steel, aluminum, or the like. At one location along the length of side wall 48, specifically in the transverse plane designated 53 in FIG. 3, there are mounted within side wall 48 four evenly circularly spaced transducers 54a, 54b, 54c, and 54d (see FIG. 5), of a type adapted to produce an electrical signal in their corresponding output lines 55 upon very slight deflection of or distortion of the elements 54a, 54b, et cetera. More specifically, each of the elements 54a, et cetera may be a strain gauge, desirably of the solid state type, in which very slight displacement or distortion of the solid state material resulting from sound induced vibration of the adjacent portion of tube 48 will produce a corresponding change in resistance of the solid state material, to thereby alter the value of an electrical current flowing from a power source 56 to an associated one of four amplifiers 57a, 57b, 57c, or 57d. The strain gauges 54a, 54b, et cetera may be very small and be secured to the adjacent inner surface of tube 48 in any appropriate manner, as by means of a suitable adhesive material. As will be apparent from FIG. 5, the four strain gauges are located at 90 degree intervals about the axis 18 of tube 48.

Because of this positioning of the four strain gauges a different circularly offset locations within tube 48, the various gauges will receive a particular sound wave which impinges on tube 48 at slightly different times, depending upon the point at which the wave initially strikes the tube, and the circular distance from that point to each of the gauges. For example, if the wave front illustrated at 59 in FIG. 5 approaches tube 48 in the direction indicated by the arrow 60, and initially strikes a side of tube 48 at the location 61 circularly between gauges 54a and 54d, the wall of the tube will act to conduct the effect of that wave front circularly in both clockwise and counterclockwise directions from the location 61 at equal rates. Since strain gauge or transducer 54a is much closer than any of the other four gauges to the location 61, the conducted sound will reach transducer 54a and cause it to produce an output signal leading to its associated amplifier 57a before the sound has reached any of the other strain gauges. The sound will next reach gauge 54d, then gauge 54c, and then gauge 54b, each after expiration of a time interval proportional to the circular distance from location 61 to that particular gauge. Thus, the output signals produced by the four gauges contain information which can be utilized to indicate to an operator the direction of approach of the sound wave front 59 toward the tube 48. Since the orientation of the various strain gauges relative to the inclined portion 26 of the directional orienting sub 19 is known, by virtue of the interfitting of mule shoe 38 with orientation key 39, any directional indication deduced from the strain gauges can be related directly to the inclined portion of the drill string and well 13.

For processing the signals from gauges 54a, 54b, 54c, and 54d, the instrument housing 47 contains an electronic circuit represented diagrammatically at 58 in FIGS. 3 and 5. This circuit 58 includes the four previously mentioned amplifiers 57a, 57b, and 57c, and 57d, which amplify the electrical signals from the various strain gauges 54a, and 54b, et cetera. Both the input and output signals of these amplifiers are wide band in nature, and include signals of many different frequencies contained within the noise which is produced by the upwardly flowing materials within the out-of-control well 10. From the amplifiers 57a, 57b, 57c, and 57d, the wide band amplified signals are fed to individual filter amplifiers 62a, 62b, 62c, and 62d, which act to pass waves of only a selected frequency out of the wide band noise from the initial amplifiers. For example, filter amplifiers 62a, 62b, 62c, and 62d may pass only signals of 100 cycles per second, desirably in sine wave form.

These sine wave outputs from filter amplifiers 62a, 62b, et cetera are fed into four individual limiter amplifiers 63a, 63b, 63c, and 63d, which give the four sine waves a constant amplitude, still preferably at the single selected frequency which passes filters 62a, 62b, et cetera. The resulting constant amplitude sine waves of selected frequency are then fed to four converters 64a, 64b, 64c, and 64d, which convert the sine waves from the limiter amplifiers to square waves, with the phases of the leading edges of these square waves from the four converters 64a, 64b, 64c, and 64d respectively differing in correspondence with the previously discussed difference in times of arrival of a particular sound impulse at the various corresponding strain gauges 54a, 54b, et cetera.

Thus, there is produced in the output line 65a from sine wave to square wave converter 64a a square wave output whose phase is dependent upon the time of arrival of a particular sound wave signal or front at the location of the corresponding gauge 54a. Similarly, in output line 65b from converter 64b, there is produced a square wave output whose phase differs from that of the signal in line 65a by an amount corresponding to the difference between the time that it takes a particular wave front to travel circularly from the location 61 to gauge 54a, and the time that it takes for the same wave front to travel circularly from location 61 to the diametrically opposite gauge 54b. These two square waves in lines 65a and 65b are fed into a common phase detector 66a, which produces a DC voltage signal proportional to the difference in phase between the two square waves in lines 65a and 65b. If the point of initial impingement of the sound wave on tube 48 were circularly midway between the two transducers 54a and 54b, this fact would be indicated by an in phase relationship between the two signals in lines 65a and 65b and a resultant zero voltage output from phase detector 66a. If, however, the sound initially impinges on the tube 48 at a location close to one of the two gauges 54a or 54b, as for instance at the location 61 of FIG. 5, the square wave produced in line 65a representing the time of arrival of the sound at gauge 54a will lead the square wave in line 65d by a relatively great amount, to produce a very substantial typically positive output from phase detector 66a. If the wave in line 65a trails rather than leading the wave in line 65d, this fact is indicated by a negative output from the phase detector.

Similarly, the square wave outputs from converters 64c and 64d associated with strain gauges 54c and 54d respectively are fed into a phase detector 66b, which produces a plus or minus DC voltage signal whose direction and value depend upon the difference between the circular spacing of gauge 54c from the point of impingement of a sound wave on tube 48, and the distance of the diametrically opposite strain gauge 54d from the point of initial impingement of that sound on the tube. The two DC signals from phase detectors 64a and 64b are then fed through isolation amplifiers 67a and 67b to a serial pulse width modulator 68, which converts these analogue signals to digital form for transmission in time-shared relation to the surface of the earth through the single electrical conductor 28 and a ground connection 69.

Within the unit 29 at the surface of the earth, the digital form time-shared signals are converted back to analogue form by a serial pulse width demodulator 70, which produces in lines 71a and 71b plus or minus DC voltage signals proportional in value and corresponding in the direction to the signals produced at the output sides of the two phase detectors 66a and 66b respectively. These signals in lines 71a and 71b are fed to servo amplifiers 72a and 72b, whose outputs are delivered to the readout resolver 30. This resolver may be of the servo motor type or any other conventional type adapted to actuate a pointer 73 to a position on a 360° circular scale 74 corresponding to and indicating visually the direction of approach of the sound along line 60 of FIG. 5 toward tube 48. If the zero point on the 360° readout scale of the resolver 30 is so located as to represent the 'high side' of the hole, that is, the side of the tool at which key 39 of FIG. 2 is located and toward which bit 17 is aimed, then the angular readout represents the direction of the out-of-control hole from relief hole 13 with respect to the high side of the hole.

In using the apparatus of FIGS. 1 to 4, assume that the relief hole 13 has been drilled to the level illustrated in FIG. 1, and that tool 20 is then lowered into the drill string to the position of FIGS. 2 and 3. To take a reading with tool 20, the drilling is stopped for a short interval, so that the strain gauges of transducers 54a, 54b, 54c, and 54d may receive and respond to noise from the nearby out-of-control hole 10. As a particular wave front 59 from the well 10 reaches and strikes tube 48 of the instrument, a shock wave is produced in the metal of that tube, and that shock wave travels from the point of impact (e.g. point 61 of FIG. 5) in opposite circular directions through the metal of the tube 48, to actuate the different gauges 54a, 54b, et cetera at slightly different times dependent upon the circular distance which must be traveled to each of the gauges. The resultant slightly out of phase electrical signals from the transducers are amplified at 57a, 57b, et cetera, filtered at 62a, 62b, et cetera, limited in value at 63a, 63b, et cetera, converted to slightly out of phase square waves at 64a, 64b, et cetera, and fed into phase detectors 66a and 66b. The DC voltage signals from those detectors 66a and 66b are converted to digital form at 68, transmitted to the surface of the earth through line 28, converted back to analogue form at 71a and 71b, and act through servo amplifiers 72a and 72b to actuate readout resolver 30 to a position representing the direction of well 10 from the relief hole 13. The values and signs of the two DC signals give together complete and precise information as to both the quadrant in which well 10 lies with respect to well 13 and the precise angular position of well 10 within that quadrant. The operator then aims the inclined portion of the orienting sub 19 of the drill string in a manner causing the bit to drill into and intersect the out-of-control hole 10, so that plugging materials may be injected into the out-of-control well from the relief hole. At any time during the drilling operation, the drill motor can be stopped and other directional reading can be taken, to enable the apparatus to drill directly into the out-of-control hole on a first attempt.

FIG. 6 shows a variational arrangement in which it is assumed that the well 10a is not out of control but rather is in production, and that a second well 13a is to be drilled in very close proximity thereto but without intersecting it. In this situation, a sound producing unit 80 of known frequency is lowered into well 10a to a depth corresponding to that of tool 20a in well 13a. The tool 20a may be the same as that shown at 20 in FIG. 1, but with filters 62a being designed to pass and respond to only the particular frequency emitted by unit 80. Tool 20a may then be utilized in the same manner discussed in connection with FIG. 1, to indicate on readout resolver 30a the relative direction of well 10a, following which the direction controlling orienting sub 19a may be turned in a direction away from hole 10a, so that the drill motor 16a will definitely avoid intersection with hole 10a. As in FIGS. 1 to 5, successive readings may be taken at different times to continually apprise the operator at the surface of the earth of the exact directional relationship between the two holes.

While certain specific embodiments of the present invention have been disclosed as typical, the invention is of course not limited to these particular forms, but rather is applicable broadly to all such variations as fall within the scope of the appended claims.

I claim:

1. The method of determining the relative positioning of two wells, that comprises receiving in a first of said wells sound emanating from the second well, responding to said sound at a plurality of different locations in said first well, determining the difference if any in time of arrival of said sound at said different locations, determining the direction of approach of said sound to the first well from said difference in arrival times at said different locations, and thereby determining the direction of said second well from the first.

2. The method as recited in claim 1, including displaying said determined direction of said second well from the first at the surface of the earth.

3. The method of determining the relative positioning of two wells, that comprises receiving at a subsurface region in a first of said wells sound emanating from the second well, conducting said received sound essentially circularly about the wall of a tubular element in said first well, responding to vibrations of said tubular element at different locations thereabout, determining the direction of approach of the sound to the first well from slight differences in arrival times at said different locations, and thereby determining the direction of said second well from the first.

4. The method of drilling a relief well into an out-of-control well at a subsurface location, that comprises receiving in said relief well sound produced by movement of material in said out-of-control well, responding to said sound at a plurality of different locations in said relief well, determining the difference if any in time of arrival of said sound at said different locations, determining the direction of approach of said sound to the relief well from said difference in arrival times at said different locations, and then drilling said relief well in the direction of said sound to approach and meet said out-of-control well.

5. The method of drilling a relief well into an out-of-control well at a subsurface location, that comprises receiving in said relief well sound produced by movement of material in said out-of-control well, conducting said received sound essentially circularly about the wall of a tubular element in said relief well, responding to vibrations of said tubular element at different locations thereabout, determining the direction of approach of the sound to the relief well from slight differences in arrival times at said different locations, and then drilling said relief well in the direction of said sound to approach and meet said out-of-control well.

6. The method of avoiding intersection of two nearby wells, that comprises producing a sound at a subsurface location in a first of said wells, receiving said sound in the second well, responding to said sound at a plurality of different locations in said second well, determining the difference if any in time of arrival of said sound at said different locations, determining said direction of approach of said sound to the second well from said difference in arrival times at said different locations, and then continuing the drilling of one of said wells in a direction avoiding intersection thereof with the position of the other well as determined from said sound.

7. The method of avoiding intersection of two nearby wells, that comprises producing a sound at a subsurface location in a first of said wells, receiving said sound in the second well, determining the direction of said first well from said second well by the direction of approach of said sound, and then purposely drilling said second well in a direction to flare progressively away from the position of said first well as determined by said sound.

8. Apparatus for determining the relative positioning of two wells, comprising sound responsive means to be lowered into a first of said wells and adapted to receive sound arriving in said first well from the second well, said sound responsive means being directionally sensitive to respond differently to sound approaching from different directions, means actuable by said directional sound responsive means to produce a signal or signals representing the directional relationship between said wells, said sound responsive means including a plurality of units positioned to receive sound at a plurality of different subsurface locations in said first well, said signal producing means including means responsive to differences in the times of arrival of sound at said different locations to produce said direction representing signal or signals.

9. Apparatus for determining the relative positioning of two wells, comprising sound responsive means to be lowered into a first of said wells and adapted to receive sound arriving in said first well from the second well, said sound responsive means being directionally sensitive to respond differently to sound approaching from different directions, and means actuable by said directional sound responsive means to produce a signal or signals representing the directional relationship between said wells, said sound responsive means including a generally annular sound conducting element to be received in said first well and adapted to receive sound first at a side thereof facing toward said second well and to conduct said sound from that side toward the opposite side of the element through the material thereof, and a plurality of sound actuable transducers connected to said generally annular element at different circularly spaced locations to respond to vibrations of said element at said spaced locations respectively and at times differing in correspondence with the different times required for conduction of sound through said element to said different locations, said signal producing means being responsive to differences in the times of arrival of sound vibrations at said different transducers to produce said direction representing signal or signals.

10. Apparatus for determining the relative positioning of two wells, comprising sound responsive means to be lowered into a first of said wells and adapted to receive sound arriving in said first well from the second well, said sound responsive means being directionally sensitive to respond differently to sound approaching from different directions, and means actuable by said directional sound responsive means to produce a signal or signals representing the directional relationship between said wells, said sound responsive means including a plurality of units positioned to receive sound at a plurality of different subsurface locations in said first well, said signal producing means including means actuable by said units to produce electrical signals whose phases differ in correspondence with the difference in time of arrival of said sound at said different locations, and means responsive to said phase difference to produce said direction representing signal or signals.

11. Apparatus for determining the relative positioning of two wells, comprising sound responsive means to be lowered into a first of said wells and adapted to receive sound arriving in said first well from the second well, said sound responsive means being directionally sensitive to respond differently to sound approaching from different directions, and means actuable by said directional sound responsive means to produce a signal or signals representing the directional relationship between said wells, said sound responsive means including a plurality of units positioned to receive sound at a plurality of different subsurface locations in said first well, said signal producing means including means actuable by said units to produce electrical signals whose phases differ in correspondence with the difference in time of arrival of said sound at said different locations, phase detecting means for producing signals dependent upon said difference in phase between said last mentioned signals, and a resolver actuable by said phase detecting means to indicate the directional relationship between said wells.

12. Apparatus for determining the relative positioning of two wells, comprising sound responsive means to be lowered into a first of said wells and adapted to receive sound arriving at a subsurface location in said first well from the second well, said sound responsive means being directionally sensitive to respond differently to sound approaching from different directions, means actuable by said directional sound responsive means to produce a signal or signals representing the directional relationship between said wells, and orienting means for orienting said sound responsive means rotatively in said first well relative to a string of pipe in said well.

13. Apparatus for determining the relative positioning of two wells, comprising sound responsive means to be lowered into a first of said wells and adapted to receive sound arriving at a subsurface location in said first well from the second well, said sound responsive means being directionally sensitive to respond differently to sound approaching from different directions, means actuable by said directional sound responsive means to produce a signal or signals representing the directional relationship between said wells, a string of pipe in said first well having a direction deviating section, and interfitting orienting elements on said sound responsive means and said direction deviating section of the pipe string for relatively rotatively orienting the sound responsive means.

14. Well apparatus comprising a tool adapted to be lowered into a well pipe and having an orienting element adapted to interfit with a mating orienting element in the well pipe to relatively rotatively orient the tool in the pipe, said tool including directionally sensitive sound responsive means for receiving sound arriving in said well from a second well, and an indicator at the surface of the earth actuable by said directionally sensitive sound responsive means to indicate the directional relationship between said two wells, said directional sensitive sound responsive means including a plurality of units positioned to receive sound at different locations in the well and at times differing slightly in correspondence with the spacing between said locations, there being means for actuating said indicator in accordance with said differences in times of arrival of the sound at said different locations.

15. Well apparatus comprising a tool adapted to be lowered into a well pipe and having an orienting element adapted to interfit with a mating orienting element in the well pipe to relatively rotatively orient the tool in the pipe, said tool including directionally sensitive sound responsive means for receiving sound arriving in said well from a second well, and an indicator at the surface of the earth actuable by said directionally sensitive sound responsive means to indicate the directional relationship between said two wells, said directionally sensitive sound responsive means including a plurality of units positioned to receive sound at different locations in the well and at times differing slightly in correspondence with the spacing between said location, there being means for producing electrical signals whose phases differ in correspondence with said differences in times of arrival of the sound at said different locations, and phase detecting means responsive to said phase differences and operable to actuate said indicator in accordance therewith.

16. Well apparatus comprising a tool adapted to be lowered into a well pipe and having an orienting element adapted to interfit with a mating orienting element in the well pipe to relatively rotatively orient the tool in the pipe, said tool including directionally sensitive sound responsive means for receiving sound arriving in said well from a second well, and an indicator at the surface of the earth actuable by said directionally sensitive sound responsive means to indicate the directional relationship between said two wells, said sound responsive means including a tubular sound conducting wall having a first pair of generally diametrically opposed transducers connected operatively thereto and a second pair of generally diametrically opposed transducers connected operatively thereto circularly intermediate the first pair, means responsive to said different transducers respectively for producing four electrical signals having phases which may differ slightly in correspondence with the different times of conduction of a sound wave through said sound conducting wall to the different transducers, a first phase detector for responding to the difference in phase of a first pair of said signals representing the first pair of said transducers, and a second phase detector for responding to the difference in phase of a second pair of said signals representing the second pair of said transducers, said indicator including a resolver responsive to said two phase detectors to produce an indication of said directional relationship between the two wells.

17. Well apparatus comprising a tool adapted to be lowered into a well pipe and having an orienting element adapted to interfit with a mating orienting element in the well pipe to relatively rotatively orient the tool in the pipe, said tool including directionally sensitive sound responsive means for receiving sound arriving in said well from a second well, and an indicator at the surface of the earth actuable by said directionally sensitive sound responsive means to indicate the directional relationship between said two wells, said sound responsive means including a tubular sound conducting wall having a first pair of generally diametrically opposed transducers connected operatively thereto and a second pair of generally diametrically opposed transducers connected operatively thereto circularly intermediate the first pair, means responsive to said different transducers respectively for producing four electrical signals having phases which may differ slightly in correspondence with the different times of conduction of a sound wave through said sound conducting wall to the different transducers, a first phase detector for responding to the difference in phase of a first pair of said signals representing the first pair of said transducers, a second phase detector for responding to the difference in phase of a second pair of said signals representing the second pair of said transducers, conductor means for conducting the outputs of said phase detectors to the surface of the earth, and servo amplifiers at the surface of the earth responsive to said outputs from the phase detectors respectively, said indicator being a 360° resolver actuable by said servo amplifiers to produce an indication of the direction between said two wells.

* * * * *